United States Patent
Knight et al.

[11] Patent Number: 5,852,658
[45] Date of Patent: Dec. 22, 1998

[54] REMOTE METER READING SYSTEM

[76] Inventors: Nelson E. Knight, 16620 CR 247, Terrell, Tex. 75160; David M. Banks, 11220 Cotillion, Dallas, Tex. 75228

[21] Appl. No.: 874,029

[22] Filed: Jun. 12, 1997

[51] Int. Cl.⁶ .................................................. H04M 11/00
[52] U.S. Cl. .................................. 379/106.03; 379/93.07; 379/106.08
[58] Field of Search .............................. 379/92.01, 92.03, 379/92.04, 93.01, 93.05, 93.06, 93.07, 93.34, 102.01, 102.02, 106.01, 106.03; 340/870.02

[56] References Cited

U.S. PATENT DOCUMENTS

| | | | |
|---|---|---|---|
| 3,922,492 | 11/1975 | Lumsden | 179/2 A |
| 4,126,762 | 11/1978 | Martin et al. | 179/2 A |
| 4,394,540 | 7/1983 | Willis et al. | 179/2 AM |
| 4,654,868 | 3/1987 | Shelley | 379/106 |
| 4,720,851 | 1/1988 | Smith | 379/107 |
| 4,856,054 | 8/1989 | Smith | 379/107 |
| 5,025,470 | 6/1991 | Thornborough et al. | 379/107 |
| 5,161,182 | 11/1992 | Merriam et al. | 379/107 |
| 5,239,575 | 8/1993 | White et al. | 340/870.02 |
| 5,369,691 | 11/1994 | Cain et al. | 379/106 |
| 5,381,462 | 1/1995 | Larson et al. | 379/107 |
| 5,452,343 | 9/1995 | Garland et al. | 379/106 |
| 5,528,675 | 6/1996 | Chen | 379/106 |
| 5,548,633 | 8/1996 | Kujawa et al. | 379/93 |
| 5,555,266 | 9/1996 | Buchholz et al. | 370/95.1 |
| 5,719,564 | 2/1998 | Sears | 340/870.02 |

*Primary Examiner*—Curtis A. Kuntz
*Assistant Examiner*—Melur Ramakrishnaiah
*Attorney, Agent, or Firm*—Steven W. Smith

[57] ABSTRACT

A system for remote automatic monitoring and recording of utility meter readings which comprises an electronic meter reader (EMR) for accumulating meter counts from a plurality of utility meters, a data concentrator which collects accumulated meter counts from the EMR, a telephone interface for placing a first data call from the EMR to the data concentrator over an available telephone line, a billing computer connected to the data concentrator, and a modem for placing a second data call including the accumulated meter counts from the data concentrator to the billing computer utilizing standard telephone service. The EMR connects the EMR to three telephone lines, and determines whether each of the plurality of telephone lines is available for placing a data call. The data concentrator sends configuration data to the EMR at the conclusion of a data call. The configuration data includes a telephone number for the data concentrator, and a time delay period before placing a subsequent data call from the EMR to the data concentrator. The EMR places the accumulated meter counts in data packets and transmits the packets to the data concentrator. The meter counts may also be transferred from the EMR to the data concentrator over a data link.

23 Claims, 3 Drawing Sheets

REMOTE METER READING SYSTEM

BACKGROUND OF THE INVENTION

1. Technical Field of the Invention

This invention relates to monitoring systems and, more particularly, to a system for remote automatic monitoring and recording of utility meter readings.

2. Description of Related Art

It has long been recognized that it desirable for utility companies to collect meter reading information from homes or apartments or commercial establishments without having to visually inspect every meter at its resident location. The traditional method of having a meter reader visually inspect each meter is a labor intensive and expensive information collection system.

A number of proposals for remote meter reading have been made, and some have been put into operation. Although there are no known prior art teachings of a solution to the aforementioned deficiency and shortcoming such as that disclosed herein, U.S. Pat. No. 5,161,182 to Merriam et al. (Merriam), U.S. Pat. No. 5,548,633 to Kujawa et al. (Kujawa), U.S. Pat. No. 5,381,462 to Larsen et al. (Larsen), U.S. Pat. No. 5,528,675 to Chen (Chen), and U.S. Pat. No. 5,452,343 to Garland et al. (Garland) discuss subject matter that bears some relation to matters discussed herein.

Merriam discloses a remote meter reading system having equipment at a telephone company office coupled by modems to a utility company computer which issues requests for customer data. Telephone trunks are used to access individual meter sites and initiate meter readings using a number of single frequency bursts. Meter readers include a microprocessor which, when interrogated, outputs the readings in a binary coded decimal format to a Dual Tone Multi-Frequency (DTW) tone generator. The system in Merriam however responds only to incoming interrogations. The microprocessor analyzes each incoming call to determine if a control signal is present on the telephone line. If the control signal is present, the microprocessor switches to an active mode and sends the requested meter counts. There is no teaching or suggestion in Merriam of a remote meter reading apparatus which will report meter counts autonomously without the need for an incoming interrogation call.

Kujawa discloses a data collection network apparatus and method. The data communications system includes at least one group of subscriber data interface elements. Each data interface element is connected to a subscriber telephone line to transmit data thereon without interfering with any telephone service that may be present on the subscriber's line. A network data interface element for each group of subscriber data interface elements is located within a short distance. A data collection unit having a data storage mechanism communicates and collects data received from networked data interface elements and assembles the data into a data frame. A data communications network carries the data frames to at least one data processing facility. The system in Kujawa is specifically designed to operate with a data communications network rather than sending signals through the Public Switched Telephone Network (PSTN) to the telephone company office. A carrier signal whose frequency is higher than the voice band is utilized. Therefore, Kujawa requires specialized data communications equipment rather than standard telephone equipment.

Larsen discloses a utility meter reading and communication system which gathers data from utility meters and sends that data to a utility company's central data collection point (host computer) via telephone lines. The system places a call on the user's telephone line at a specified time and date, and transmits data using the DTMF format. The system ensures that users may still use the telephone line by sensing off-hook conditions initiated by a resident's telephone and immediately dropping the line to re-establish a dial tone for the residential customer. Larsen thus connects to only a single outgoing telephone line, and if that line becomes busy, interrupts the data call so that the subscriber can proceed with his or her telephone call. However, Larsen has the disadvantage that if the single telephone line is in use the data call cannot be initiated. Additionally, if the single telephone line is disconnected because, for example, the tenant moves, or the line is otherwise out of service, then data calls cannot be placed.

Chen discloses a network interface unit for serving a central office line and one or more local stations by interfacing remotely monitored devices such as utility controllers and meter readers, to an existing customer telephone line that serves the customer site. Chen must receive an incoming interrogation call in order to arm a network interface unit and begin the transmission of data.

Garland discloses a method and apparatus for accessing customer meters and for controlling customer devices over a telephone line. A connection using a single distinctive burst of power ringing or tone is established over a customer line between a central office and customer station equipment to alert both the customer and the customer premises equipment. The connection is between a data accessing device such as a meter reading controller and a customer premises device such as a meter interface unit. Signals are exchanged over the connection between these two units without alerting the subscriber via a ringing signal and without changing the supervisory state of the customer's station equipment from on-hook. Garland thus requires an incoming interrogation call to alert the meter interface unit and trigger the transmission of data.

Review of each of the foregoing references reveals no disclosure or suggestion of a system such as that described and claimed herein.

In order to overcome the disadvantage of existing solutions, it would be advantageous to have a system for remote automatic monitoring and recording of utility meter readings that utilizes standard telephone equipment to transmit data, and utilizes a plurality of telephone lines for the data transmission. The present invention provides such a system.

SUMMARY OF THE INVENTION

The present invention is a system for remote automatic monitoring and recording of utility meter readings that utilizes standard telephone equipment to transmit data, and utilizes a plurality of telephone lines for the data transmission. In particular, the present invention is a system for remote automatic monitoring and recording of utility meter readings which comprises an electronic meter reader (EMR) for accumulating meter counts from a plurality of utility meters, a data concentrator which collects accumulated meter counts from one or more EMRs, means for placing a first data call from the EMR to the data concentrator over an available telephone line, a billing computer which utilizes standard telephone service to call the data concentrator, and means for placing a second data call from the billing computer to the data concentrator to collect the accumulated meter counts. The EMR includes a telephone interface which connects the EMR to a plurality of telephone lines, and means for determining whether each of the plurality of telephone lines is available for placing a data call which includes the accumulated meter counts.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
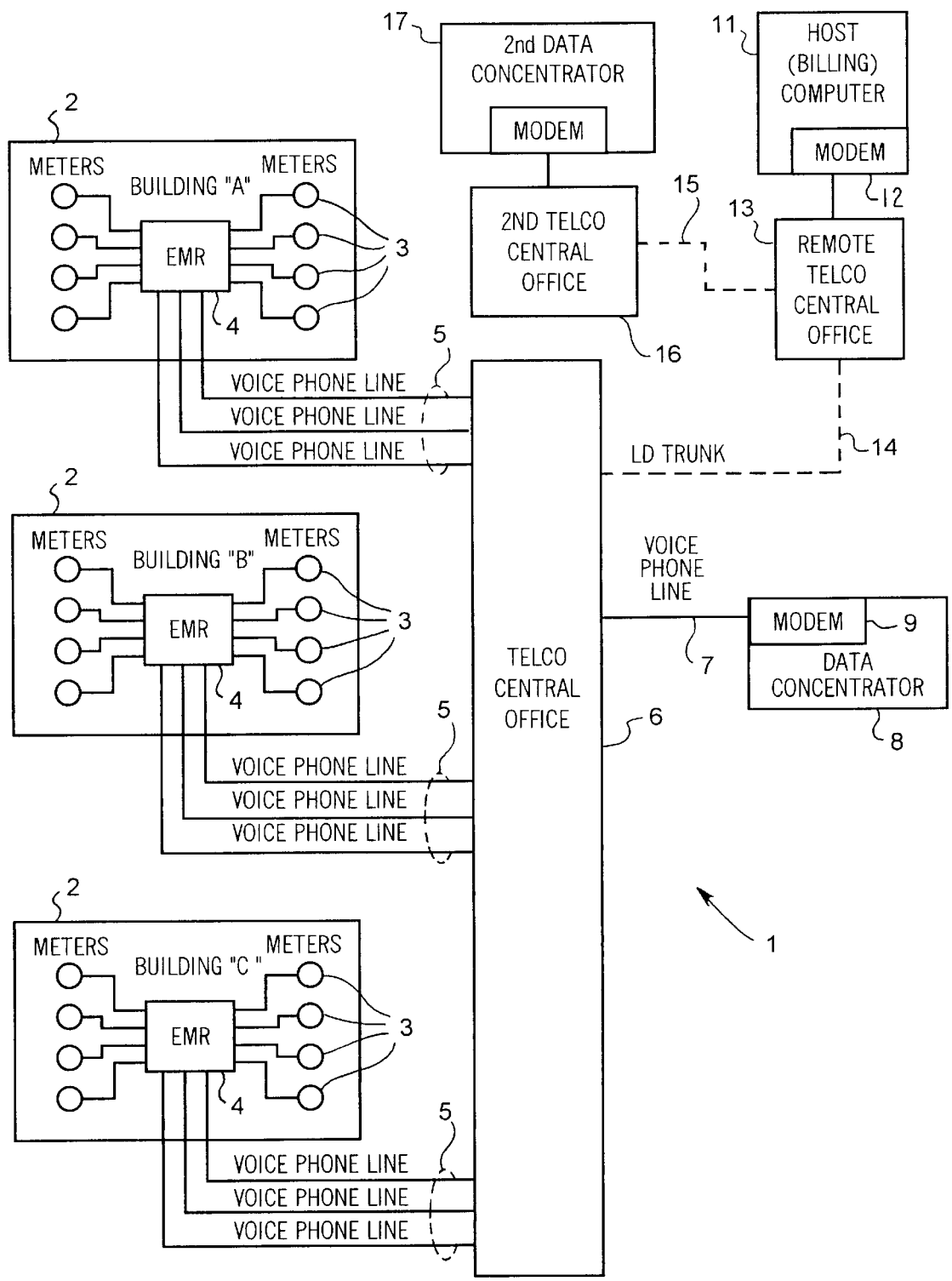
FIG. 1 is a simplified block diagram of the preferred embodiment of the automatic meter reading system of the present invention.

The present invention is an automatic meter reading system for reading utility meters at a location such as an apartment building and reporting the meter readings ultimately to a centralized billing computer. FIG. 1 is a simplified block diagram of the preferred embodiment of the automatic meter reading system 1 of the present invention. One or more apartment buildings 2 are equipped with a plurality of utility meters 3 which may be, for example, electric meters, water meters, natural gas meters, or a combination of these and other utility meters. Each of the meters 3 is connected to an Electronic Meter Reader (EMR) 4. In the preferred embodiment of the present invention the EMR 4 is capable of monitoring up to 24 different utility meters, although at the option of the manufacturer, fewer meters may be monitored. The EMR is a call-out-only device which accumulates and stores meter counts from each of the plurality of utility meters 3.

The EMR 4 is connected to three tenant telephone lines 5 which carry communications between the apartment building 2 and a telephone company (Telco) central office 6. By connecting to three different telephone lines, the EMR is provided with double redundancy in the event that one or more of the telephone lines is not usable for data transfers. A telephone line may be unusable for several reasons. For example, the tenant may be using the telephone at the time that a data call is scheduled, an incoming call may be ringing the line, service to the telephone line may have been disconnected because the tenant has moved out, or any other reason that the telephone line is out of service.

From the Telco's central office 6, communications travel via telephone line 7 to a data concentrator 8. The data concentrator 8 is equipped with a modem 9 for communications over the telephone line 7. The data concentrator communicates with one or more EMRs 4 located at different apartment buildings 2 throughout a designated area. The data concentrator 8 collects accumulated meter counts for all of the utility meters 3 from each monitored apartment building. Periodically, a centralized host (billing) computer 11, which may be remotely located, communicates with the data concentrator 8, and collects the accumulated meter counts from all of the sites for billing purposes. In the preferred embodiment, the billing computer 11 communicates through standard telephone service via a modem 12 and, if applicable, through a remote Telco central office 13 and long distance (LD) trunk 14.

The billing computer 11 may also collect accumulated meter counts from other sites. This is illustrated in FIG. 1 through the use of a second LD trunk 15 from the remote Telco central office 13 to a second Telco central office 16 and associated second data concentrator 17.

The three telephone lines 5 from the apartment building 2 to the Telco central office 6 are telephone lines associated with selected tenants within the apartment building 2. The EMR 4 is programmed to find an available telephone line, determine whether a dial tone is present, and utilize that line to report accumulated meter counts after a predetermined period of timne following the last report. This time period is selected so that the data call is made at a time of the day or night which minimizes the probability of interfering with normal telephone use by the tenant. For example, the call may be made at 3:00 a.m. or perhaps in the middle of the work day when the tenant is not likely to be home. The call to the local Telco central office is normally a local call, therefore, the selected tenant does not accrue long distance phone charges for these calls.

The EMR is equipped with circuitry to detect whether each of the telephone lines 5 is in use or if an incoming ring is being received. In either event, the line is considered busy until ten seconds after either the last ring, or the line is no longer in use. If the tenant phone goes off-hook after the EMR 4 has initiated a call, the EMR does not release the line but attempts to complete the call.

In addition to making its pre-programmed data calls, the EMR reports accumulated meter counts in an alarm call whenever a trouble condition occurs such as loss of A/C power for a predetermined time period (for example, 10 minutes), or upon manual request by a technician at the EMR. The 10-minute outage requirement prevents nuisance calls to the data concentrator as a result of short power interruptions. The alarm call includes data indicating that the call is a result of an extended power failure. Each EMR is programmed with a short delay between 2 and 18 minutes before placing the alarm call for a power outage. The delay may be made unique to each EMR, for example, by basing the delay on the EMR serial number. In this manner, multiple EMRs are prevented from simultaneously attempting to call the data concentrator following a power outage.

The current condition of both the AC line and the battery are included in the data packet of every call. After the call is dialed, the EMR waits up to forty-five seconds for a validated connection.

Both the EMR and the billing computer call the data concentrator 8. Therefore, when the data concentrator answers a call, it must first determine which one is calling. The data concentrator first attempts to communicate with an EMR by sending a single Dual Tone Multi-Frequency (DTW) digit as a recognition signal. A DTMF digit is one of the sixteen standard tone pairs in the DTMF set. If there is no response, the data concentrator attempts to communicate with a standard modem such as the one utilized by the billing computer.

When the EMR receives the recognition digit, it begins to transmit EMR identifying information such as an address or serial number to inform the data concentrator 8 which EMR unit is calling in. It then sends the accumulated meter counts. The data is transmitted in binary form to minimize the amount of data transmitted. The data is broken up into packets which have a 16-bit Cyclic Redundancy Check (CRC) appended as an error detection method. The 16-bit CRC computation may include a site-specific or system-specific code which prevents the data from being exchanged with other sites or systems.

The same packet protocol is used for transmission in both directions between the EMR 4 and the data concentrator 8. Each packet must be acknowledged as either good or bad, or else a timeout occurs. In the event of a bad packet or timeout, the EMR 4 retransmits the data packet. After a predetermined number of retransmission attempts, the communications attempt is suspended. In this event, a recall timer is set for a value between 10 and 255 minutes which has been determined at the time of installation. When this timer expires the call is attempted again. Recall attempts continue for up to twenty-four hours. If still unsuccessful, the call attempt is abandoned.

After the EMR 4 has sent all of the meter counts to the data concentrator 8, an end-of-data packet is sent which may trigger the data concentrator to send configuration information back to the EMR including a recall time delay before the next data call. The EMR does not have a real time clock; it has a next-call timer. The EMR calls in at power-up, at the expiration of the next-call timer, at a trouble event, or at a manual request. The final data packet sent from the data concentrator to the EMR 4 is an ending packet which signals the EMR that the call has been completed, and instructs the EMR to release the telephone line and start the next-call timer.

When the next-call timer expires, the ENM attempts to place a call. If any of the three lines has not been in use or ringing for the previous 10 seconds (i.e., is "available"), the EMR goes off hook and checks for a dial tone. If two or more of the three lines are available, the EMR utilizes a different line for each call, based on which line was utilized for the previous call or call attempt. In this manner, a low quality line attached to the EMR cannot prevent data transfer if there is another line available.

If a dial tone is not available, the call attempt is abandoned, and the recall timer is set. When the recall time expires, another call is attempted if a line is available. If multiple lines are then available, the call is placed on a different line from the previous call attempt. If a call is placed, but cannot be completed for any reason such as Busy, No Ring, No Answer, or excessive bad data packets, then the call is abandoned, and the recall timer is set. Another call is attempted later, as described above.

Most of the configuration information of the EMR 4 may be changed by the data concentrator 8. This information includes:

1. Data storage port—part of the data storage location in the data concentrator.
2. Data storage address—part of the data storage location in the data concentrator.
3. Default call interval—interval to attempt calls if the specific interval is not set on each call by the concentrator.
4. Recall interval—interval to wait between failed call attempts (minimum 10 minutes).
5. Phone number—number to call to reach the data concentrator.
6. Leak threshold—configurable value of hours to use in the leak detection subprogram.
7. Meter reading—new value to be set into a counter.
8. Next call time—the specific interval to wait before the next call.

This value is computed from a data file stored at the data concentrator which specifies a call-in time for each EMR. This time interval is utilized in conjunction with the real-time clock in the data concentrator to compute the interval for a specific EMR to wait before the next call. This allows all the EMRs to call in on a synchronized schedule unless there is an extended power failure which results in a reset of the EMR when power is restored.

Figure 2:
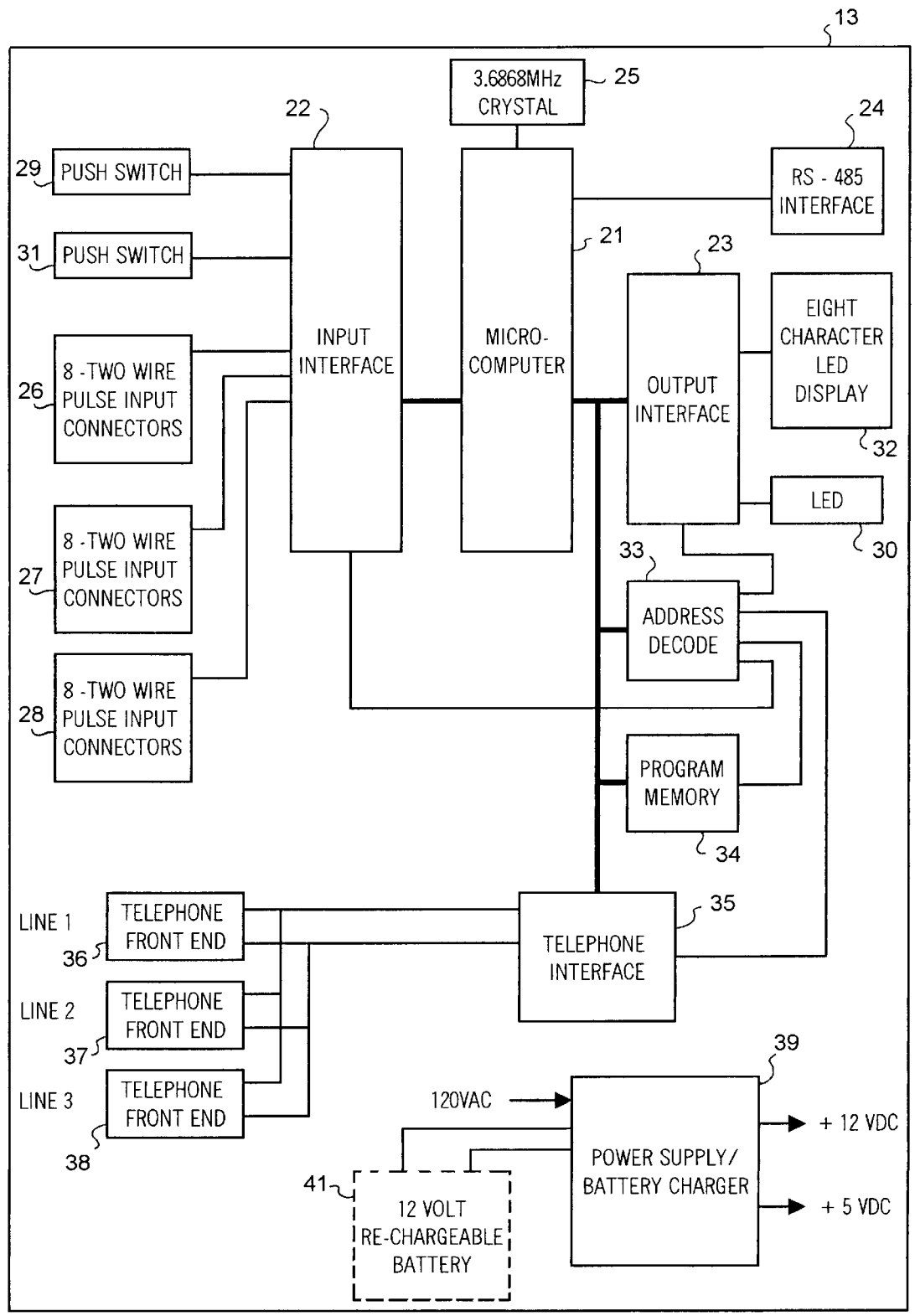
FIG. 2 is a block diagram of the preferred embodiment of the electronic meter reader (EMR) of FIG. 1.

FIG. 2 is a simplified block diagram of the preferred embodiment of the electronic meter reader (EMR) 4 of FIG. 1. A microcomputer 21 is connected to an input interface 22, an output interface 23, an RS-485 interface 24, and a 3.6868 MHz crystal clock 25. Meters which are being read by the EMR connect to the input interface 22 via two-wire pulse input connectors 26, 27, and 28. In the preferred embodiment of the present invention there are a total of twenty-four two-wire pulse input connectors. These are configured in three sets of eight connectors 26, 27 and 28. Two push switches 29 and 31 are also connected to the input interface 22 for on-site testing purposes and manual operation of the EMR 4. Push switch 29 forces a call-out from the EMR to the data concentrator 8. Push switch 31 causes meter readings to be displayed on an 8-character LED display 32 which is connected to the output interface 23. The LED display 32 may be utilized by a service technician or by on-site meter reading personnel when telephone communications are inoperative. The 8-character LED display 32 may display, for example, the meter number on two digits and the reading value on the other six digits of the display. A user can therefore step through the different meters and obtain readings for each one. A second LED 30 lights up to indicate when data communications are being conducted.

The data connection between the microcomputer 21 and the output interface 23 also connects to an address decoder 33, a program memory device 34, and a telephone interface 35. The telephone interface 35, in turn, is connected to telephone front ends 36, 37 and 38 which connect to line-1, line-2, and line-3, respectively. A power supply/battery charger 39 receives 120 volts AC and outputs 12 volts DC and 5 volts DC power. A 12-volt rechargeable backup battery 41 may optionally be connected to the power supply/battery charger. The backup battery 41 supplies power to the EMR for up to 60 hours after an AC power failure.

The EMR may be configured at installation to report accumulated meter counts at periodic intervals. This interval may be remotely modified by the data concentrator 8. For utility companies that charge different rates during different periods of the day or week, the EMR may be programmed to report meter counts at the beginning and ending of peak periods.

The EMR 4 also performs the additional function of leak detection. Rather than utilizing a complicated scheme of calculating usage rates, and determining when the usage rate exceeds a threshold amount, the EMR of the present invention instead determines when there is no leak. The determination that there is no leak is made simply by determining that over a particular time period (for example, a 24-hour period), usage of the utility was less than a predetermined amount.

For each meter there are 24 bits of storage related to leak detection. There is a 24-hour counter for all meters which determines which one of the 24 bits is to be manipulated during a specific hour. The hour counter is not synchronized to the actual hour of the day. If a count is detected, then the bit for that meter and that hour is set. When the hour increments, a subprogram runs which doe s the following:

For each meter, the number of bits that are set (of the 24 total bits for the meter) is determined. This total is checked against a configurable value which specifies how many hours during a 24-hour period must elapse without a count for a "no leak" condition to be declared. If the configurable value is 0, leak detection is disabled, and leaks are not reported. If the configurable value is 24, then any count in the 24-hour period is interpreted and reported as a leak condition. A summary bit for the meter is either set or cleared based on the result of this comparison test (0=no leak; 1=leak). The summary bit is reported as part of the data packet on each call. After the above tests, the bit for the current hour is cleared so that the current hour is started in a "no leak" condition.

The subprogram runs every hour, thus providing a 24-hour sliding window for leak detection.

For maintenance purposes, whenever a meter setting is changed, either at the EMR or with an update over the phone line, the 24 leak-detection bits for that meter are cleared. If a meter was changed out, or work was performed to correct a leak, resetting the count clears the bits and helps prevent a false leak report from being sent to the data concentrator. Whenever the leak-detection configurable hour value is changed, the hourly subprogram is immediately run to generate a current leak detection summary based on the new configurable hour value.

Figure 3:
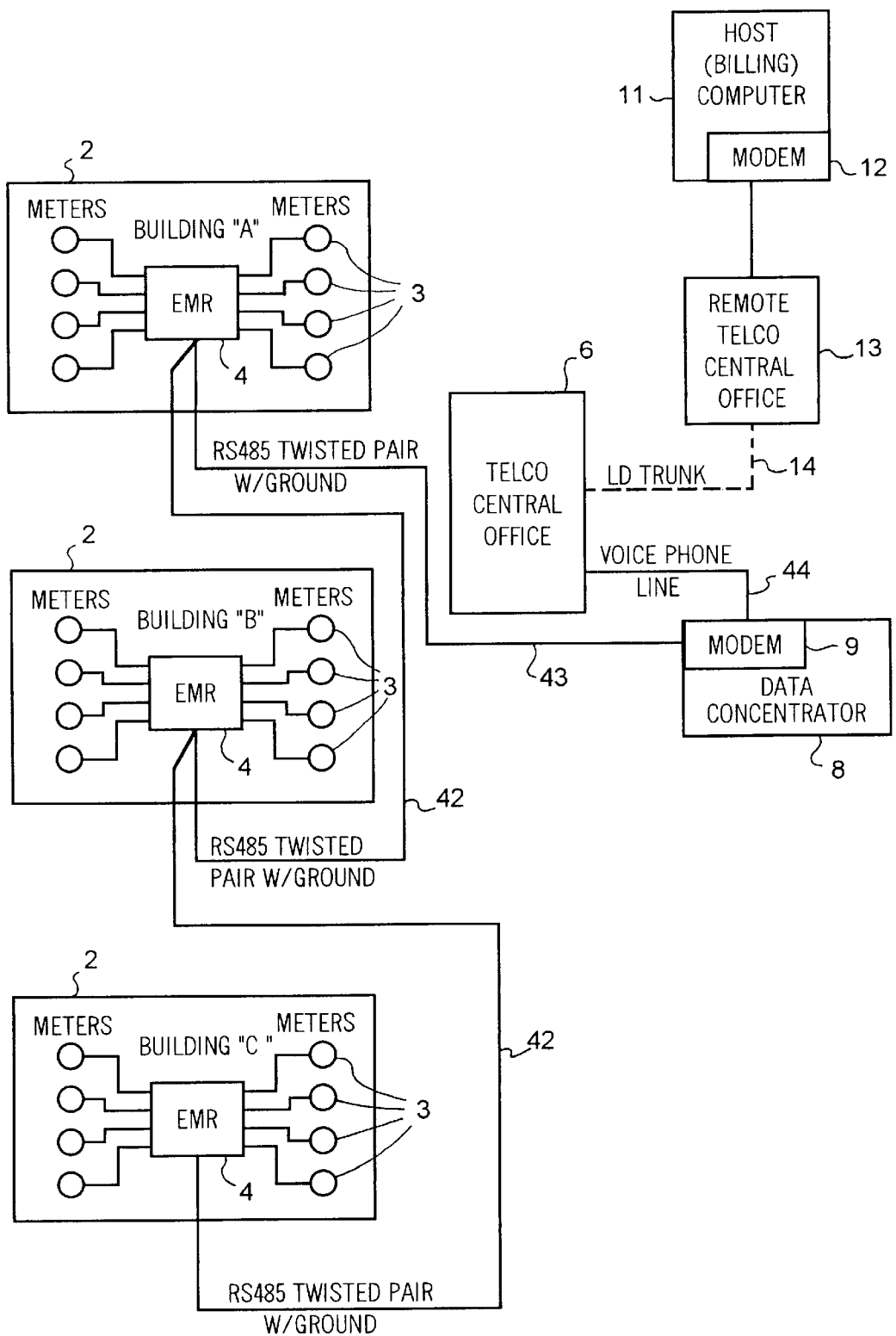
FIG. 3 is a simplified block diagram of an alternative embodiment of the automatic meter reading system of the present invention in which the EMR communicates with the data concentrator over a data link utilizing an RS-485 twisted pair interface.

FIG. 3 is a simplified block diagram of an alternative embodiment of the automatic meter reading system of the present invention in which the EMR 4 communicates with the data concentrator 8 over a data link utilizing an RS-485 twisted pair interface. An RS-485 twisted pair with ground 42 connects each EMR 4 in the buildings 2 at the site. Another RS-485 twisted pair with ground 43 connects the EMR in Building "A" to the data concentrator 8, enabling meter readings from all of the EMRs at the site to be transmitted directly to the data concentrator. The data concentrator 8 transmits the accumulated meter readings to the billing computer 11 via a voice telephone line 44, the Telco central office 6, and if the billing computer is remote, through the LD trunk 14 and remote Telco central office 13.

The data concentrator 8 may be connected via RS-485 data link to some EMRs and by telephone line to other EMRs. The data concentrator can store the data received from both the RS-485 EMRs and the telephone EMRs in the same data format. The centralized billing computer 11 calls the data concentrator 8 and retrieves the entire data set on demand. The billing computer and the data concentrator may utilize a commercial high speed modem protocol.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for remote automatic monitoring and recording of utility meter readings comprising:
    an electronic meter reader (EMR) for accumulating meter counts from a plurality of utility meters, said EMR including:
        a telephone interface which connects said EMR to a plurality of standard landline telephone lines;
        means for determining whether each of said plurality of standard landline telephone lines is available for placing a data call; and
        means for selecting an available telephone line from said plurality of standard landline telephone lines;
    a data concentrator which collects accumulated meter counts from said EMR;
    means for automatically placing a first data call from said EMR to said data concentrator over said selected available telephone line, said first data call including said accumulated meter counts;
    a billing computer connected to said data concentrator; and
    means for placing a second data call from said billing computer to said data concentrator, said second data call collecting said accumulated meter counts.

2. The system for remote automatic monitoring and recording of utility meter readings of claim 1 wherein said system includes a plurality of EMRs, and each of said plurality of EMRs accumulates meter counts from a plurality of utility meters and reports said accumulated meter counts to said data concentrator.

3. The system for remote automatic monitoring and recording of utility meter readings of claim 1 wherein said EMR includes a timer that measures a time delay period before placing said first data call.

4. The system for remote automatic monitoring and recording of utility meter readings of claim 1 wherein said data concentrator includes means for sending configuration information to said EMR when said EMR places said first data call.

5. The system for remote automatic monitoring and recording of utility meter readings of claim 4 wherein said configuration information includes a telephone number for said data concentrator, and a time delay period before placing a subsequent data call from said EMR to said data concentrator.

6. The system for remote automatic monitoring and recording of utility meter readings of claim 1 further comprising means for transferring said accumulated meter counts from said EMR to said data concentrator over a data link.

7. The system for remote automatic monitoring and recording of utility meter readings of claim 6 wherein said data concentrator includes:
    means for collecting said meter counts over said data link;
    means for collecting said meter counts over said available telephone line; and
    means for storing said meter counts collected over said data link, and said meter counts collected over said available telephone line in a single data format.

8. The system for remote automatic monitoring and recording of utility meter readings of claim 1 wherein said means for placing a first data call from said EMR to said data concentrator over an available telephone line includes means for placing said accumulated meter counts in data packets and transmitting said packets to said data concentrator.

9. The system for remote automatic monitoring and recording of utility meter readings of claim 8 wherein said data concentrator includes means for determining whether a bad packet was received.

10. The system for remote automatic monitoring and recording of utility meter readings of claim 9 wherein said means for placing said accumulated meter counts in data packets and transmitting said packets to said data concentrator includes:
    means for selecting a second available line from said plurality of standard landline telephone lines; and
    means for retransmitting a packet that was received as a bad packet upon determining that a bad packet was received over said second available line.

11. The system for remote automatic monitoring and recording of utility meter readings of claim 10 wherein said means for placing a first data call from said EMR to said data concentrator over an available telephone line includes means for periodically retrying said first data call upon determining that a bad packet was received, and repeatedly retransmitting the bad packet did not result in a good packet being received.

12. The system for remote automatic monitoring and recording of utility meter readings of claim 8 wherein said data concentrator includes means for sending an acknowledgement to said EMR when a data packet is received.

13. The system for remote automatic monitoring and recording of utility meter readings of claim 12 wherein said EMR includes means for determining whether said acknowledgement is received from said data concentrator before a timeout occurs.

14. The system for remote automatic monitoring and recording of utility meter readings of claim 13 wherein said means for placing said accumulated meter counts in data packets and transmitting said packets to said data concentrator includes means for retransmitting a packet for which an acknowledgement was not received before said timeout occurs.

15. The system for remote automatic monitoring and recording of utility meter readings of claim 1 wherein said means for determining whether each of said plurality of telephone lines is available includes:

means for determining whether a dial tone is present on any one of said plurality of telephone lines which has been idle for a predetermined time period; and means for determining whether a dial tone is present on any one of said plurality of telephone lines which has not rung for said predetermined time period.

16. The system for remote automatic monitoring and recording of utility meter readings of claim 1 wherein said means for placing a first data call from said EMR to said data concentrator over an available telephone line includes means for placing said first data call from a second telephone line if a first telephone line is not available.

17. The system for remote automatic monitoring and recording of utility meter readings of claim 1 wherein said means for placing a first data call from said EMR to said data concentrator over an available telephone line includes means for placing said first data call whenever a trouble condition is detected.

18. The system for remote automatic monitoring and recording of utility meter readings of claim 17 wherein said EMR includes a backup battery which powers said EMR following an AC power failure, and said means for placing a first data call from said EMR to said data concentrator utilizes said backup battery to place said first data call when there is an AC power failure.

19. The system for remote automatic monitoring and recording of utility meter readings of claim 1 wherein said means for placing a first data call from said EMR to said data concentrator places said call upon manual request by a user at said EMR.

20. The system for remote automatic monitoring and recording of utility meter readings of claim 1 wherein said EMR also includes means for determining whether one of said utility meters is connected to a utility line which has a leak.

21. The system for remote automatic monitoring and recording of utility meter readings of claim 20 wherein said means for determining whether one of said utility meters is connected to a utility line which has a leak includes means for determining whether there is a predetermined time period during which no meter counts are recorded from said utility meter.

22. The system for remote automatic monitoring and recording of utility meter readings of claim 1 wherein said means for placing a second data call from said data concentrator to said billing computer includes means for utilizing standard telephone service to place said second data call which includes said accumulated meter counts.

23. A system for remote automatic monitoring and recording of utility meter readings comprising:

an electronic meter reader (EMR) for accumulating meter counts from a plurality of utility meters, said EMR including:

a telephone interface which connects said EMR to a plurality of standard landline telephone lines;

means for determining whether each of said plurality of standard landline telephone lines is available for placing a data call; and means for selecting an available telephone line from said plurality of standard landline telephone lines;

a data concentrator which collects accumulated meter counts from said EMR and sends configuration data to said EMR, said configuration data including a telephone number for said data concentrator, and a time delay period before placing a subsequent data call from said EMR to said data concentrator;

means for placing a first data call from said EMR to said data concentrator over said selected available telephone line, said means for placing said first data call including means for placing said accumulated meter counts in data packets and transmitting said packets to said data concentrator;

means for transferring said accumulated meter counts from said EMR to said data concentrator over a data link;

a billing computer connected to said data concentrator; and means for placing a second data call from said billing computer to said data concentrator, utilizing standard telephone service, said second data call collecting said accumulated meter counts.

* * * * *